United States Patent
Meyrahn et al.

(10) Patent No.: US 11,801,960 B2
(45) Date of Patent: Oct. 31, 2023

(54) SYSTEM FOR WIRELESS MONITORING OF OPERATING AND PRODUCTION PARAMETERS OF A MACHINE FOR FOOD PRODUCTION

(71) Applicant: Poly-clip System GmbH & Co. KG, Hattersheim (DE)

(72) Inventors: Joachim Meyrahn, Erzhausen (DE); Markus Scheding, Hochheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 586 days.

(21) Appl. No.: 16/859,484

(22) Filed: Apr. 27, 2020

(65) Prior Publication Data
US 2020/0339294 A1   Oct. 29, 2020

(30) Foreign Application Priority Data
Apr. 29, 2019   (EP) .................................. 19171707

(51) Int. Cl.
*G05B 19/418* (2006.01)
*B65B 57/00* (2006.01)
(Continued)

(52) U.S. Cl.
CPC .......... *B65B 57/00* (2013.01); *A22C 11/0245* (2013.01); *A22C 11/125* (2013.01);
(Continued)

(58) Field of Classification Search
CPC ... B65B 57/00; A22C 11/0245; A22C 11/125; G05B 19/048; G05B 19/418; G05B 2219/32181; G05B 15/00; G06Q 10/20; H04W 12/77
USPC ........................................................ 700/108
See application file for complete search history.

(56) References Cited

U.S. PATENT DOCUMENTS 6,646,564 B1 * 11/2003 Azieres .................. G08B 25/14
340/506
2013/0167208 A1   6/2013 Shi
(Continued)

FOREIGN PATENT DOCUMENTS

CN      109496198 A  *  3/2019
DE      202013011509    *  2/2014
(Continued)

OTHER PUBLICATIONS

EPO; Application No. 19171707.3; Extended European Search Report dated Nov. 14, 2019.

*Primary Examiner* — Hien D Khuu
(74) *Attorney, Agent, or Firm* — Fitch, Even, Tabin & Flannery LLP

(57) ABSTRACT

A system for wireless monitoring of operating and production parameters of a clipping machine for food production having a sealed housing protected at least against moisture. The system comprises at least one measuring and control device for controlling the production process and measuring the operating and/or production parameters of the machine, sensors for determining operating parameters of the machine, devices for determining production parameters of the machine, at least one wireless communication device, a user interface and display device, and at least one smart device having at least an optical reading unit, wherein the at least one wireless communication device is configured to generate login details for wireless communication and encrypt the login details into a binary code which can be read by the optical reading unit of the smart device via the user interface and display device.

11 Claims, 2 Drawing Sheets

(51) Int. Cl.
    *A22C 11/12*     (2006.01)
    *G06Q 10/20*     (2023.01)
    *H04W 12/77*     (2021.01)
    *G05B 19/048*     (2006.01)
    *A22C 11/02*     (2006.01)

(52) U.S. Cl.
    CPC ........... *G05B 19/048* (2013.01); *G06Q 10/20* (2013.01); *H04W 12/77* (2021.01); *G05B 19/418* (2013.01); *G05B 2219/32181* (2013.01)

(56) References Cited

U.S. PATENT DOCUMENTS

| | | | | |
|---|---|---|---|---|
| 2015/0067018 A1* | 3/2015 | Connolly | ............ | G06Q 30/016 709/202 |
| 2015/0286895 A1 | 10/2015 | Carbonini | | |
| 2018/0132510 A1* | 5/2018 | Sedlacek | ................... | A23L 5/00 |
| 2019/0083989 A1 | 3/2019 | Tran et al. | | |
| 2020/0156915 A1* | 5/2020 | Hofmann | ............. | G05B 19/409 |

FOREIGN PATENT DOCUMENTS

| | | | | |
|---|---|---|---|---|
| EP | 1746030 B1 | 4/2008 | | |
| EP | 3006358 A1 | 4/2016 | | |
| EP | 2457444 B1 | 4/2018 | | |
| EP | 3339996 A1 * | 6/2018 | | |
| EP | 3566585 A1 * | 11/2019 | ........... | A22C 11/006 |
| WO | WO-2010118864 | * 10/2010 | | |
| WO | 2016033345 A1 | 3/2016 | | |
| WO | WO-2016164931 A1 * | 10/2016 | | |
| WO | WO-2020260961 | * 12/2020 | | |

\* cited by examiner

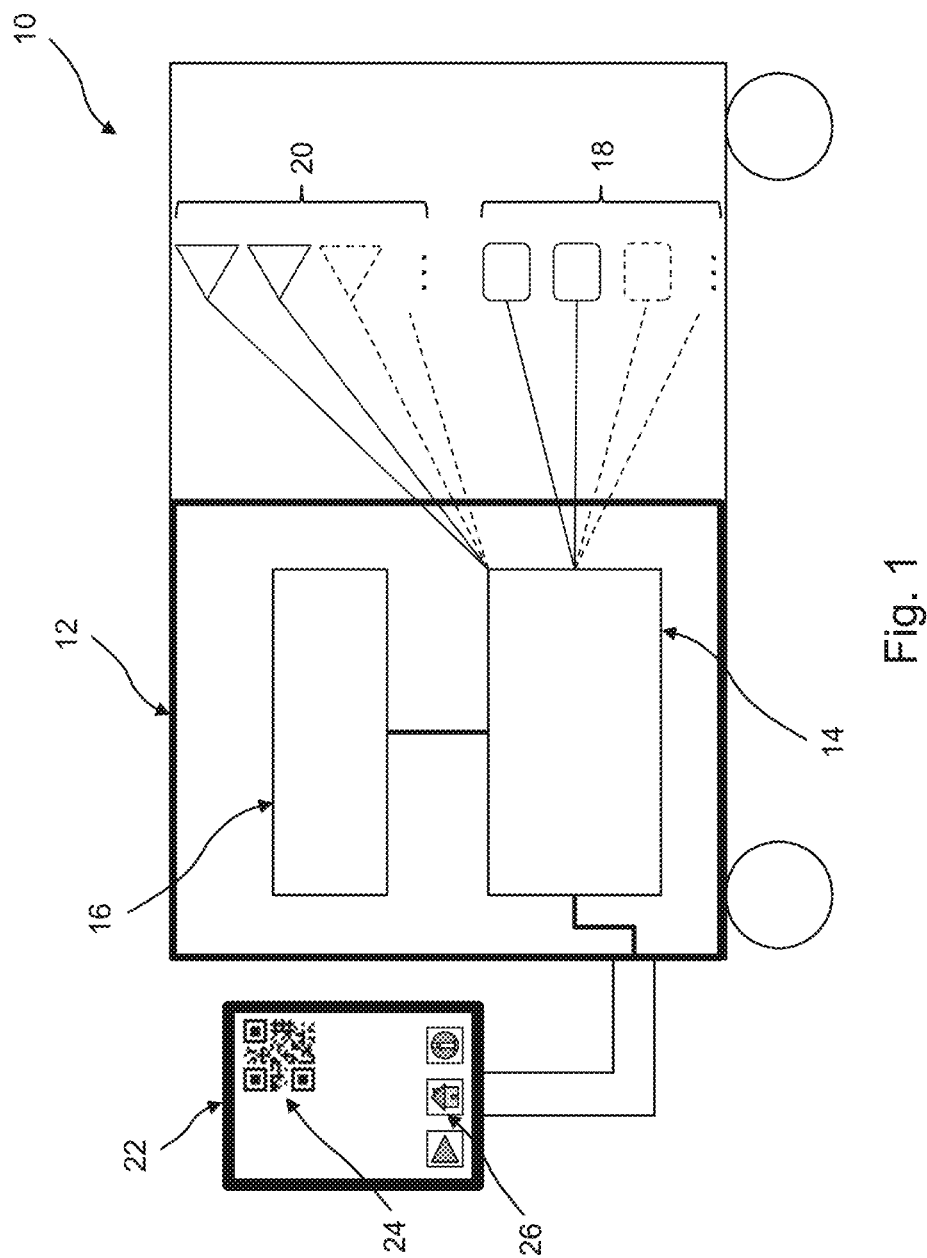

SYSTEM FOR WIRELESS MONITORING OF OPERATING AND PRODUCTION PARAMETERS OF A MACHINE FOR FOOD PRODUCTION

CROSS-REFERENCE TO RELATED APPLICATION

The present application claims the benefit of priority of European Patent Application No. 19171707.3 filed on Apr. 29, 2019, the contents of which are incorporated herein by reference in their entirety.

FIELD OF THE INVENTION

The present invention relates to a system for wireless monitoring of operating and production parameters of a machine for food production, like a clipping machine.

In particular, the present invention relates to a system which enables the user to access the operating and production parameters of a machine via wireless communication between a wireless communication device inside a sealed housing of the machine and a smart device.

BACKGROUND OF THE INVENTION

In practice, it is known that a precise estimation of upcoming maintenance cycles of a machine for food production saves money, not just because machine downtime for maintenance actions is inevitable, but also because the functioning of the machine is guaranteed which generally means that the machine is able to reach its predicted life cycle. Concerning this matter, an extensive monitoring of operating parameters of a machine is essential. The same is true for production parameters, like e.g. the number of clips in case of a clipping machine, which have to be recharged in good time.

The data obtained during the operation of the machine, i.e. the operating parameters and/or the production parameters, can be displayed on a display device provided with the machine. However, if this data is to be stored for production control and maintenance timing purposes, it is necessary to transfer this data to a production control database. In practice, this is done by means of cable connections via which the machine can be connected to the corresponding internal network of the production facility, and thus to said database. In addition, further cable connections are necessary if the machine is part of a production line where the machine itself or a preceding or following machine controls the production process of at least parts of the production line.

The cable connections necessary for the above-mentioned purposes require that the housing of the machine must be provided with corresponding openings for cables or at least with corresponding openings for the insertion of connectors.

However, during the food production a vast quantity of water is spent, whereby the machines are continuously exposed to a moist environment. In particular, for reasons of hygiene, the machines are cleaned with a lot of water and partially with aggressive cleaning agents, which is why the sensitive electronic components of a food production machine have to be specially protected. This is realized in that the electronic components are accommodated in a sealed housing which is protected at least against any kind of moisture.

Hence, the additional openings in the housing of the machine for cables or connectors require additional sealing measures in order to prevent the penetration of moisture into the moisture-sensitive area inside the machine, i.e. in particular the area where the electronics of the machine are housed. This not only increases the manufacturing costs for the machine due to the additional components, but also due to the increased assembly effort.

Therefore, it is an object of the invention to provide a system for an enhanced and secured access to operating and production parameters of a machine for food production enabling the user to monitor the state of a machine.

SUMMARY OF THE INVENTION

The aforesaid object with respect to the system for monitoring operating and production parameters of a machine for food production is achieved by the features as described herein. Advantageous configurations of the invention regarding the system are also described herein.

According to the present invention, there is provided a system for wireless monitoring of operating and production parameters of a machine for food production, like a clipping machine, having a sealed housing protected at least against moisture. The system comprises at least one measuring and control device for controlling the production process executed by the machine and measuring the operating and production parameters of the machine, the at least one measuring and control device being arranged inside the sealed housing. The system further comprises operating parameter determining means or sensors for determining operating parameters of the machine, wherein the operating parameter determining means are arranged in the machine and are connected to the at least one measuring and control device, and production parameter determining means or devices for determining production parameters of the machine, wherein the production parameter determining means are arranged in the machine and are connected to the at least one measuring and control device. Moreover, the system comprises at least one wireless communication device which is arranged inside the sealed housing and is connected with the at least one measuring and control device and a user interface and display device which is provided outside the sealed housing, the user interface and display device being connected to the at least one measuring and control device. Furthermore, the system comprises at least one smart device having an optical reading unit, wherein the at least one wireless communication device is configured to generate login details for wireless communication and encrypt the login details into a binary code. This binary code can be read by the optical reading unit of the smart device via the user interface and display device.

Operating parameters are those parameters related to wear and tear parts of the machine. Accordingly, operating parameter determining means can be any sensors able to determine the wear and tear of a respective component, wherein the determined quantity or degree of wear and tear is converted into an electronic signal to be received by the at least one measuring and control device. For instance, an optical sensor can monitor a critical part of a bearing for wear and tear, but also a lubricant supply or the hydraulic pressure of an actuator measured e.g. by a piezoelectric sensor can be subsumed under the category of operating parameters.

Production parameters are those parameters directly related to the production of food, i.e. the number or the consumption of expendable materials by which the number of manufactured food products can be quantified. Another quantification of manufactured food products is possible by counting the number of cycles of certain machine elements, for instance counting the number cylinder strokes every time a product is stamped with a logo.

As already mentioned, food production is closely related to a high level of water consumption, whether it be the amount of water needed in the production of the specific food product or the amount of water necessary to clean the machines. Consequently, the machines for food production are generally surrounded by moist environment such that the sensitive electronic components have to be protected against moisture. Hence, a sealed housing has to be provided which allows the accommodation of all sensitive electronic components and ensures the protection against moisture.

At the same time, a sealed housing guarantees that an unauthorized manipulation of the electronic components is prevented.

One possibility to provide the wireless access to operating and production parameters of a machine is to set up a hotspot, i.e. the machine is equipped with a gateway unit which is able to create a hotspot. However, greater production sites commonly comprise hundreds of machines involved in the food production so as to hundreds of different hotspots would be accessible provided that each machine is able to create its own one. The individual monitoring of a machine quickly becomes complex.

This is why it is desirable that, on the one hand, a machine is enabled to visibly or acoustically indicate that a threshold value relating to an operating and/or production parameter is exceeded or will be reached soon, and, on the other hand, a user should be able to easily access the operating and production parameters of the machine via wireless communication, for instance between the machine and a smart device, like a smart phone, which nowadays is carried around anyway.

At this point, it should also be taken into account that a food production machine of one manufacturer may be used together with machines of other manufacturers which means that different service technicians may be present at the production site. This, in turn, leads to the requirement that a wireless access to operating and production parameters of a machine is preferably encrypted to deny unauthorized access.

According to this, the at least one wireless communication device, which e.g. can be a smart factory edge gateway based on an IPC, sets up a hotspot or WLAN access point and generates a random service set identifier (SSID) and a password. These two data together with the Internet Protocol (IP) address of the at least one wireless communication device form the login details to access the hotspot. Subsequently, the login details are converted into a binary code, like a Quick Response code (QR code), whereby the login details become substantially encrypted. These encrypted login details are sent via a connection, like a cable connection, to the at least one measuring and control device. The at least one measuring and control device forwards the encrypted login details in form of a binary code, like a QR code, to the user interface and display device where the binary code is displayed.

Thus, it can be avoided that a user standing in front of a machine whose operating and production parameters should be monitored has to have a list containing at least a machine number or comparable to identify the machine, the corresponding SSID, and the corresponding access password, but the capability to just read in the QR code and decrypt the login details encrypted in form of a QR code by means of a smart device having an optical reading unit and a suitable software application. This can be regarded as much more user-friendly and time-saving, since the user does not have to re-enter the login details every time that he is trying to access the operating and production parameters of a machine. It can be assumed that the login details change in predetermined time intervals for the mentioned security reasons.

A further requirement concerning the wireless communication device is the retrofitting capability, i.e. distributed machines for food production without any communication device should be easily upgradable by just installing a wireless communication device inside the sealed housing and connecting it to the at least one measuring and control device.

The measuring and control device takes over the task of controlling the production steps of the machine and measuring the operating and production parameters. For this purpose, an industrial PC (IPC) can be used that preferably is set up as a real time controller by means of a corresponding software.

Per the optical reading unit, like a camera or a laser scanner, of the smart device, like a smartphone, the binary code displayed on the user interface and display device can be captured. A software application installed on the smart device and preferably verified decrypts the encrypted login details in form of the binary code and establishes a connection between the smart device and the at least one wireless communication device. The connection establishment can be automatically or depend on a user input by confirming the connection on the smart device.

Once having established the connection between the smart device and the at least one wireless communication device, the software application running on the smart device is able to show the operating and production parameters of the machine for food production. The software application generally allows to access all electronically determinable machine parameters. However, not all of them are of the same interest to maintain the functionality and the manufacturing capability of the machine. For instance, a common measuring and control device used in a clipping machine for producing sausage-shaped products, like sausages, is able to determine over two million parameters. To monitor and analyze this number of parameters might be regarded as highly inefficient, which is why a preselection of relevant parameters has to be defined. Nevertheless, the user always has to have the opportunity to amend and adapt this preselection which will be described later on.

To ensure that the essential machine parameters are always shown by the software application on the smart device, even if the preselection has been amended, the software application provides an exclusive area on the display of the smart device specially reserved for showing the essential machine parameters.

The software application on the smart device also may be able to remind the user of the next monitoring cycle.

The user interface and display device preferably may be a touch screen, whereat other embodiments are imaginable, like a screen and a keyboard. However, a minimum of peripheral additions mounted on the machine is paramount. The touch screen, on the one hand, displays—besides the encrypted login details in form of a binary code—certain predefined virtual one-touch buttons assigned to specific functions, on the other hand, it is possible to navigate to specific menus and settings by wiping or sliding with the finger over the display. Additionally, the possibility to enter individual commands by a virtual keyboard is provided such that the preselected operating and production parameters to be transmitted to the smart device can be amended. The layout of the display is customizable to match the individual user preferences.

Furthermore, according to another preferred embodiment, an antenna for signal enhancement is provided outside the sealed housing and connected to the wireless communication device.

Depend on the material used for the sealed housing (machines in the food production are commonly made of stainless steel for hygiene reasons), it may occur that the radio wave signal emitted by the wireless communication device is damped or even blocked by the sealed housing such that an establishment of a wireless connection is not possible. In this case, an antenna can be mounted or installed on the machine outside the sealed housing. Furthermore, due to the antenna longer connection distances between smart device and machine can be realized.

In a further embodiment of the present invention, the user interface and display device or the smart device is configured to initiate a machine self-testing procedure.

After maintenance actions for which a machine normally has to be turned off or a machine failure causing a machine breakdown, it is desirable to automatically check the successful operation of the machine before restarting the food production. Therefore, a self-testing procedure can be implemented to check the functionality at least of all essential machine components. This self-testing routine can be initiated by a function provided by the software application on the smart device or by use of the user interface and display device. The later may provide a one-touch virtual button to trigger the self-testing procedure.

In a preferred embodiment, the parameters determined by the operating parameter determining means and the production parameter determining means are adapted to be stored in an external memory.

Since the storage capacity of an IPC used as a measuring and control device is limited, it is advantageous, if the determined operating and production parameters can additionally be stored on an external memory, like a network storage or a cloud space. In this regard, the determined parameters should be in an adequate data format that can be handled platform independently to avoid information loss due to data conversion.

In a further preferred embodiment, the wireless communication device is configured to wirelessly forward the operating parameters and production parameters to the external memory.

In order to forward the determined operating and production parameters to an external memory, the wireless communication device has to establish a connection in the first place, wherein the connection is established at predefined intervals or continuously to prevent any loss of information.

According to another preferred embodiment, the wireless communication device is configured to log in into an intranet and maintain this connection.

Many companies run an internal network, a so-called intranet, protected against any access from outside the company network and used for networked cooperation among the employees. The wireless monitoring of a company's machine park can be to integrate into its IT landscape, namely the intranet, without the necessity of elaborately installing a cable infrastructure. The wireless communication devices already provide the wireless integration into a network such that merely the log in routine of the machines into the intranet has to be defined by a company's IT division.

In yet another preferred embodiment of the present invention, the wireless communication device is configured to wirelessly forward an order of spare parts for the machine.

Due to the regularly or continuously monitoring of a machine for food production, broken or worn parts or components of the machine can be identified. Against this background, it would be desirable, if a spare part arrives at the very moment when its corresponding operating machine part fails. Thus, machine downtime could be minimized and the warehouse size could be reduced.

Alternatively, the system of the present invention should at least be capable to automatically order spare parts if needed to save time.

For the implementation of an automatic order process, a digital spare parts catalog can be stored either on the measuring and control device or on the smart device available for the software application. Since the operating parameter determining means are already assigned to a specific part or component of the machine, merely a computer program routine has to be implemented to find the corresponding spare part number or order number of a broken part or element by means of the digital spare parts catalog.

Subsequently, the determined spare part number is either send up from the measuring and control device to the wireless communication device and from there to the smart device which is generally connected to the world wide web or the identifier of the broken part is forwarded to the software application where a program routine searches the corresponding spare part number. Via internet connection the thus determined spare parts can be ordered.

In a further preferred embodiment, the wireless communication device is configured to wirelessly forward an order of expendable materials dependent on the supply.

Comparable to the automatic spare part order process described above, the system according to the present invention can be capable to order expendable materials expended in the manufacturing of food products. Therefore, the current consumption of expendable materials determined by the production parameter determining means is compared by a computer program routine with the initial supply in order to calculate the optimal moment to place an order. The program routine can be run either on the measuring and control device or on the smart device. Same is true for the value of the initial supply which can be stored on the measuring and control device or on the smart device. Furthermore, if the machine for food production is connected to an internal company network in which the current supply data are available, the computer program routine will be independent of any initial value.

In another preferred embodiment, the binary code displayed on the user interface and display device can be a QR code.

A QR code should be preferred due to its fast readability and greater storage capacity compared to standard Universal Product Code (UPC) barcodes.

In the following, further advantages and embodiments of the inventive system are described in conjunction with the attached drawings. Thereby, the expression "left", "right", "below", and "above" are referred to the drawings in an orientation of the drawings which allows the normal reading of the reference numbers.

BRIEF DESCRIPTION OF THE DRAWINGS

In the drawings:

FIG. 1: is a schematic view of a machine for food production set up for wireless monitoring of operating and production parameters;

DETAILED DESCRIPTION

Figure 2B:
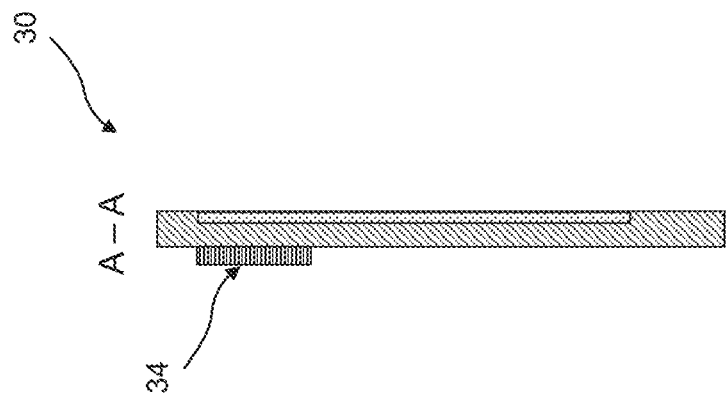
FIG. 2B: is a cross section view along line A-A of a smart device having an optical reading unit.

A movable machine 10 for food production, like a clipping machine used in the production of sausage-shaped products, set up for wireless monitoring of operating and production parameters is schematically shown in FIG. 1.

Machine 10 comprises a sealed housing 12 which accommodates at least one measuring and control device 14 and at least one wireless communication device 16 which is connected to the at least one measuring and control device 14.

Sealed housing 12 is at least protected against moisture surrounding the machine 10. To access the electronic components accommodated inside sealed housing 12, sealed housing 12 has a resealable opening, like a pivotable door with a rubber seal along the edges. Sealed housing 12 is a separate part of machine 10 and is not involved in the production process.

Connected via cable to the at least one measuring and control device 14, there are operating parameter determining means 18 as well as production parameter determining means 20 outside sealed housing 12 in machine 10. The cable bushings into sealed housing 12 are separately sealed. Operating parameter determining means 18 and production parameter determining means 20 are attached to the parts and components of machine 10 to be monitored.

Outside sealed housing 12, a user interface and display device 22 is mounted to machine 10 and connected to measuring and control device 14, wherein here again the cable bushing is separately sealed. User interface and display device 22 is preferably a touch screen which displays content and control elements. Moreover, user interface and display device 22 is adapted to interact with a user, i.e. user interface and display device 22 is not only able to display data, but it provides input means for inputting data by the user. Furthermore, user interface and display device 22 displays inter alia encrypted login details received from measuring and control device 14 in form of a QR code 24 and one-touch virtual buttons 26 assigned to a specific command. Additionally, it is possible to enter individual commands, for instance by means of a virtual keyboard.

Figure 2A:
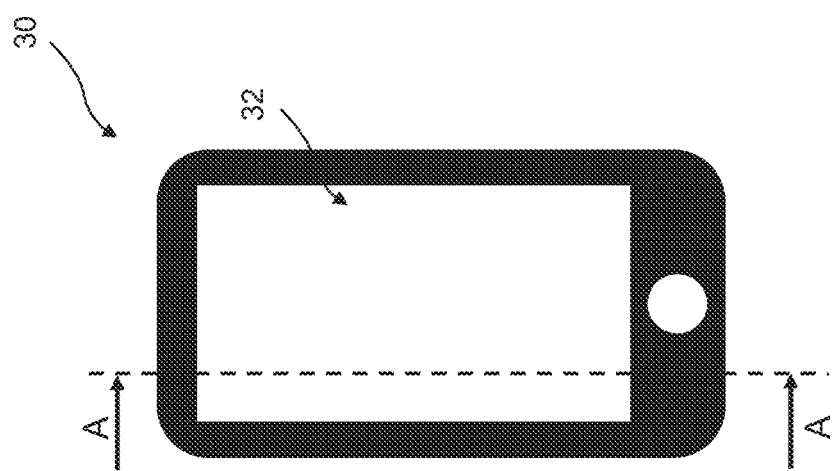
FIG. 2A: is a front view of a smart device having an optical reading unit.

FIGS. 2A and 2B show a smartphone 30 as an embodiment of a smart device in a front view and in a cross section view along the line A-A, respectively. Smartphone 30 comprises a touch display 32 on the front side and an optical reading unit 34 on the rear side. Optical reading unit 34 is capable to capture QR code 24. A software application which has to be downloaded, installed and verified converts QR code 24 into the decrypted login details and establishes a wireless connection between smartphone 30 and wireless communication device 16 to access the operating and production parameters.

Wireless communication device 16 having established a hotspot converts the login details for an encrypted wireless connection into a binary code, like a QR code.

The login details comprise at least the SSID and the IP address of wireless communication device 16 and a password. This QR code is forwarded from wireless communication device 16 via cable through measuring and control device 16 to user interface and display device 22 where QR code 24 is permanently displayed.

During food production, operating parameter determining means 18 and production parameter determining means 20 determine operating parameters and production parameters, respectively. The determined operating and production parameters are transmitted to measuring and control device 14 which controls the food production steps of machine 10. Measuring and control device 14 stores the determined parameters in its cache or internal memory, wherein all determined parameters can be stored or only those preselected in advance.

In order to monitor the operating and production parameters of machine 10, a user has to read in QR code 24 by means of optical reading unit 34 of his smartphone 30. A software application which has been installed and verified on his smartphone 30 decrypts QR code 24 and, by using the decrypted login details, establishes a wireless connection to wireless communication device 16. Being successfully connected to wireless communication device 16, the user is able to access the operating and production parameters which are retrieved from measuring and control device 14 via wireless communication device 16.

What is claimed is:

1. A system for wireless monitoring of operating and production parameters of a machine for food production, particularly a clipping machine, comprising:
    at least one measuring and control device for controlling a production process executed by the machine and measuring operating and/or production parameters of the machine, the at least one measuring and control device being arranged inside a sealed housing of the clipping machine which is protected at least against moisture;
    operating parameter determining sensors for determining operating parameters of the machine, wherein the operating parameter determining sensors are arranged in the machine and are connected to the at least one measuring and control device;
    production parameter determining devices for determining production parameters of the machine, wherein the production parameter determining devices are arranged in the machine and are connected to the at least one measuring and control device;
    at least one wireless communication device which is arranged inside the sealed housing and is connected with the at least one measuring and control device;
    a user interface and display device which is mounted to the machine and provided outside the sealed housing, the user interface and display device being connected to the at least one measuring and control device via a cable; and
    at least one smart device having at least an optical reading unit,
    wherein the at least one wireless communication device is configured to generate login details for wireless communication and encrypt the login details into a binary code which can be read by the optical reading unit of the at least one smart device via the user interface and display device to establish wireless communication between the machine and the smart device,
    wherein the at least one measuring and control device is configured to transmit the encrypted login details to the user interface and display device to be displayed.

2. The system according to claim 1, wherein the binary code displayed on the user interface and display device is adapted to be captured by the optical reading unit of the smart device, wherein the at least one smart device provides a software application adapted to decrypt the binary code and to access the operating and production parameters of the machine.

3. The system according to claim 1, wherein the user interface and display device is provided with an input device being connected to a processing device which is configured to process user input.

4. The system according to claim 1, wherein an antenna for signal enhancement is provided outside the sealed housing and connected to the wireless communication device.

5. The system according to claim 1, wherein the user interface and display device or the smart device is configured to initiate a machine self-testing procedure.

6. The system according to claim 1, wherein the parameters determined by the operating parameter determining sensors and the production parameter determining devices are adapted to be stored in an external memory.

7. The system according to claim 1, wherein the wireless communication device is configured to wirelessly forward the operating parameters and production parameters to the external memory.

8. The system according to claim 1, wherein the wireless communication device is configured to log in into an intranet and to maintain connection.

9. The system according to claim 1, wherein the wireless communication device is configured to wirelessly forward an order of spare parts.

10. The system according to claim 1, wherein the wireless communication device is configured to wirelessly forward an order of expendable materials dependent on the supply.

11. The system according to claim 1, wherein the binary code displayed on the user interface and display device is a QR code.

* * * * *